US007742437B2

(12) United States Patent
Yeung et al.

(10) Patent No.: US 7,742,437 B2
(45) Date of Patent: Jun. 22, 2010

(54) CSNP CACHE FOR EFFICIENT PERIODIC CSNP IN A ROUTER

(75) Inventors: Derek Man-Kit Yeung, Union City, CA (US); Christian Hopps, San Francisco, CA (US); Nair Venugopal, Fremont, CA (US); Anthony Li, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 633 days.

(21) Appl. No.: 11/280,950

(22) Filed: Nov. 15, 2005

(65) Prior Publication Data
US 2006/0227790 A1 Oct. 12, 2006

Related U.S. Application Data

(60) Provisional application No. 60/628,247, filed on Nov. 15, 2004.

(51) Int. Cl.
*H04L 12/28* (2006.01)
(52) U.S. Cl. .................. 370/255; 370/389; 370/429; 709/238; 707/200
(58) Field of Classification Search .............. 370/254, 370/255, 235, 236, 252, 351, 363, 400, 429, 370/338, 352, 389, 390; 714/13; 709/238, 709/216; 707/200–206; 455/456.1
See application file for complete search history.

(56) References Cited

U.S. PATENT DOCUMENTS

| 5,946,679 | A | 8/1999 | Ahuja et al. | |
|---|---|---|---|---|
| 6,185,608 | B1 * | 2/2001 | Hon et al. | 709/216 |
| 6,738,387 | B1 * | 5/2004 | Lin et al. | 370/429 |
| 7,379,453 | B1 * | 5/2008 | DiMambro | 370/363 |
| 2002/0031107 | A1 * | 3/2002 | Li et al. | 370/338 |
| 2002/0150094 | A1 * | 10/2002 | Cheng et al. | 370/389 |
| 2003/0026246 | A1 * | 2/2003 | Huang et al. | 370/352 |
| 2003/0026268 | A1 * | 2/2003 | Navas | 370/400 |
| 2003/0084371 | A1 * | 5/2003 | Mongazon-Cazavet et al. | 714/13 |
| 2003/0087646 | A1 * | 5/2003 | Funato et al. | 455/456 |
| 2003/0185209 | A1 * | 10/2003 | Lee | 370/390 |
| 2004/0028060 | A1 * | 2/2004 | Kang | 370/400 |
| 2005/0050223 | A1 * | 3/2005 | Roeder et al. | 709/238 |
| 2005/0122955 | A1 * | 6/2005 | Lin et al. | 370/351 |
| 2006/0013125 | A1 | 1/2006 | Vasseur et al. | |
| 2006/0045024 | A1 | 3/2006 | Previdi et al. | |
| 2006/0114916 | A1 | 6/2006 | Vasseur et al. | |

FOREIGN PATENT DOCUMENTS

WO WO-2004059922 A2 7/2004
WO WO-2006/055576 A2 5/2006

OTHER PUBLICATIONS

Oran, "OSI IS-IS Intra-domain Routing Protocol", Feb. 1990, RFC 1142, pp. 22, 34 and 37.*

(Continued)

*Primary Examiner*—Kwang B Yao
*Assistant Examiner*—Jeffrey M Rutkowski
(74) *Attorney, Agent, or Firm*—Schwegman, Lundberg & Woessner, P.A.

(57) ABSTRACT

A networking device such as a router may include, in one embodiment, a database storing a plurality of link state entries, and a cache operatively coupled with the database, the cache storing entries relating to the link state entries of the database. The networking device may also include a module for sending, over a network, packets including link state data, the module operatively coupled with the cache. In one example, the module accesses the cache to create one or more packets including link state data. Embodiments of the invention may be used for forming CSNP packets (complete sequence number packets) without the need for having to repeatedly walking a link state database in order to form the CNSP packets.

18 Claims, 6 Drawing Sheets

OTHER PUBLICATIONS

Sharon, O., "Dissemination of routing information in broadcast networks: OSPF versus IS-IS," Network, IEEE, vol. 15, No. 1, pp. 56-65, Jan./Feb. 2001.*

"International Search Report for corresponding PCT Application No. PCT/US05/41401", (Oct. 12, 2006), 3 pgs.

"Written Opinion of the International Searching Authority for corresponding PCT Application No. PCT/US05/41401", (Oct. 12, 2006), 3 pgs.

"Chinese Application Serial No. 200580031052.4, Office Action Mailed Dec. 18, 2009", 3 pgs.

"Chinese Application No. 200580031052.4, Office Action Mailed May 8, 2009", 12 pgs.

Oran, S., "Dissemination of Routing Information in Broadcast Network: OSPF Verus IS-IS", IEEE Networks, (Jan.-Feb. 2001).

* cited by examiner

CSNP CACHE FOR EFFICIENT PERIODIC CSNP IN A ROUTER

CROSS REFERENCE TO RELATED APPLICATION

This application claims priority under 35 U.S.C. 119(e) to U.S. provisional patent application No. 60/628,247 filed Nov. 15, 2004 entitled "CSNP Cache for Efficient Periodic CSNP," the disclosure of which is hereby incorporated by reference herein in its entirety.

FIELD OF THE INVENTION

This invention relates, in general, to networking devices, and more specifically to handling CSNP packets in a networking device such as router.

BACKGROUND OF THE INVENTION

In computer networks, routing protocols are used to communicate route information dynamically as networking devices such as routers are added or removed from the network. Routers may build packets or messages known as link-state packets (LSPs) based upon their local interfaces, and an LSP packet describes the router's interfaces and neighbors in the network (i.e., adjacent routers). Typically, an LSP message includes the name of the router that originated the LSP packet, a sequence number, and a list of "links" or neighboring routers.

Each router uses a conventional "flooding" algorithm to transmit its LSPs to adjacent neighbors, and the LSPs are passed along unchanged to other adjacent routers until all the routers in the area have received them. When collected together, the LSPs can be used to describe the topology of the network.

Each router maintains a link-state database (LSDB) that includes all the LSPs the router has received. When a change in the network topology occurs, a corresponding change in one or more of the LSPs will follow.

Designated routers send packets known as CSNP packets (complete sequence number protocol data units (PDUs)) to other routers in order to maintain database synchronization relating to network topology information. CSNP packets include as all the link states known to the router sending the CSNP packets. For instance, in the routing protocol IS-IS (Intermediate System to Intermediate System), designated routers send CSNP packets for ensuring that all routers participating in the protocol have a complete copy of the link state database. Typically, a CSNP message includes entries that each have a source identification (LSP IDs, identifying the source router for this respective LSP) and a sequence number corresponding to the LSP.

Each router that receives CSNP packets compares the list of link states (i.e., from the LSPIDs and the sequence numbers) in the CSNP packets with its own internal link state database. For instance, a mismatch in a sequence number in a router receiving a CSNP indicates that the receiving router may not have the most current link state as reported by another router in the network. Differences are resolved by either transmitting LSPs in the receiver's database or by transmitting a request (in the form of a partial sequence number (PSNP)) to another router for transmission of the missing LSPs.

CSNP packets or messages are sent periodically based on a CSNP interval timer which defines the number of seconds between transmissions of CSNP packets from an interface. Periodic CSNP transmission is required on local area networks (LANs) by the IS-IS specification. Conventionally, periodic CSNP packet transmission is implemented in a router by the using CPU resources to walk its link state database and rebuild the resulting the CSNP packets every time a CSNP timer expires. For instance, as shown in FIG. 1, a conventional router 10 includes an IS-IS software process 12 which operatively includes a link-state database 14 and a periodic CSNP function 16.

As topologies have grown more dense, however, there have been scaling issues. As recognized by the present inventors, there are a number of issues that make periodic CSNP transmission problematic. The CSNP interval on a given interface is configurable, the maximum transmission unit (MTU) on various interfaces might not be identical, and there may be hundreds if not thousands of interfaces or links such as peer-to-peer links (P2P) to support. Furthermore, the amount of CPU time that can be devoted to the CSNP processing can be quite limited. Rebuilding the CSNP packets by walking a link state database after every expired CSNP timer may require excessive CPU resources of a router.

Accordingly, as recognized by the present inventors, what is needed is a method and apparatus that provides periodic CSNP functionality while reducing CPU consumption and increasing scalability.

The features, utilities and advantages of the various embodiments of the invention will be apparent from the following more particular description of embodiments of the invention as illustrated in the accompanying drawings.

DETAILED DESCRIPTION

Embodiments of the present invention provide a cache that may be used in forming CSNP packets for transmission. The cache may be implemented in a networking device such as a router. Various embodiment of the present invention are disclosed herein.

Figure 1:
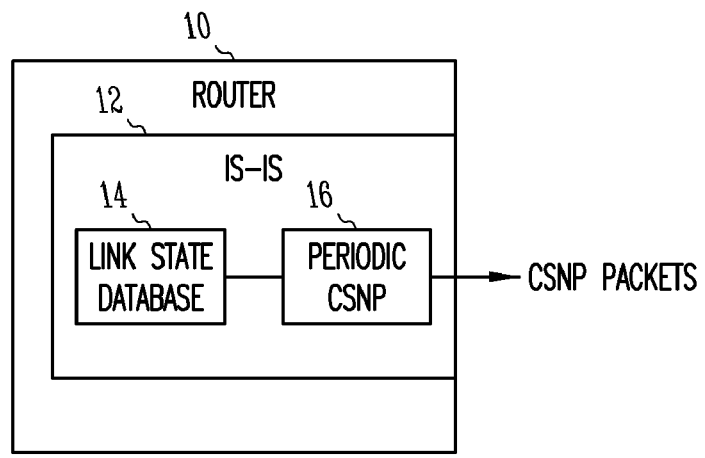
FIG. 1 illustrates a block diagram of a conventional router.
Figure 2:
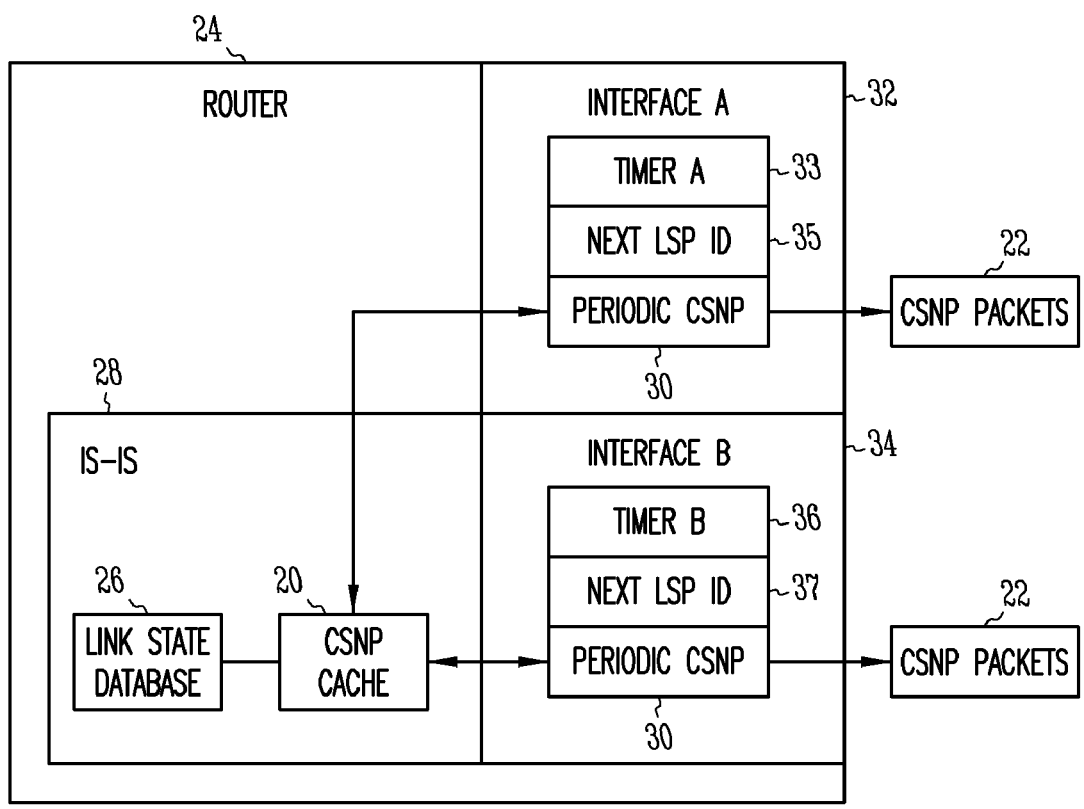
FIG. 2 illustrates a block diagram of an example of a router having a CSNP cache, in accordance with one embodiment of the present invention.

As shown in FIG. 2, embodiments of the present invention provide a cache 20 that can be used for forming CSNP messages 22 for transmission from a router 24. The cache 20 provides entries needed to perform the CSNP function without requiring CPU resources to walk a link state database 26 to rebuild CSNP values every time a CSNP timer expires.

Various features which may be implemented in the cache are described herein. In one example, the router 24 may also include an IS-IS software process 28, a link-state database (LSDB) 26 containing one or more links states, and a periodic CSNP process 30.

In one embodiment, a link state database 26 may include one or more entries describing links in a network, and these entries may be derived from link state packets (LSPs) messages received from other routers in the network, or may be derived from interfaces of the present router and describe the neighboring routers thereto. The link state database 26 may be implemented using any conventional process or technique for managing the link state database 26. Generally, the link state database 26 may include all relevant data from LSPs, including LSP headers, LSP IDs, and the body or payload of a link state packet which may include sequence numbers and neighboring routers or links. For instance, the link state database 26 may include a tree of all LSPs, in on example.

A router 24 of the example of FIG. 2 may implement a periodic CSNP function 30 wherein the router 24 periodically transmits a CSNP message or messages 22 to other routers in a network, wherein the CSNP messages 22 are used to communicate the other routers the content of the link state database 26 of the router 24. The router 24 may have multiple interfaces 32, 34, and each interface may be provided with an independent CSNP timer and a "Next LSP ID" router, in accordance with one example of the invention.

In order to reduce CPU resources consumed by duplicated LSDB walks when building CSNP packets for large number of interfaces (such as but not limited to P2P and DIS LAN interfaces), embodiments of the present invention provide a CSNP cache 20. In one example, each entry in the cache 20 represents a CSNP fragment, which size may be limited to LSP MTU size to ensure it can be sent over any IS-IS interface. Upon CSNP timer expiration, the interface picks the next fragment from the cache 20 for transmission. As a result, no LSDB walk is required when a CSNP timer expires so long as LSDB 26 is stable.

In one example, each interface 32, 34 of router 24 can access the CSNP cache 20 in order to generate CSNP packets 22. All of the CSNP interface timers may be distributed via a timer wheel. This could provide a uniform distribution of processing over time.

Figure 3:
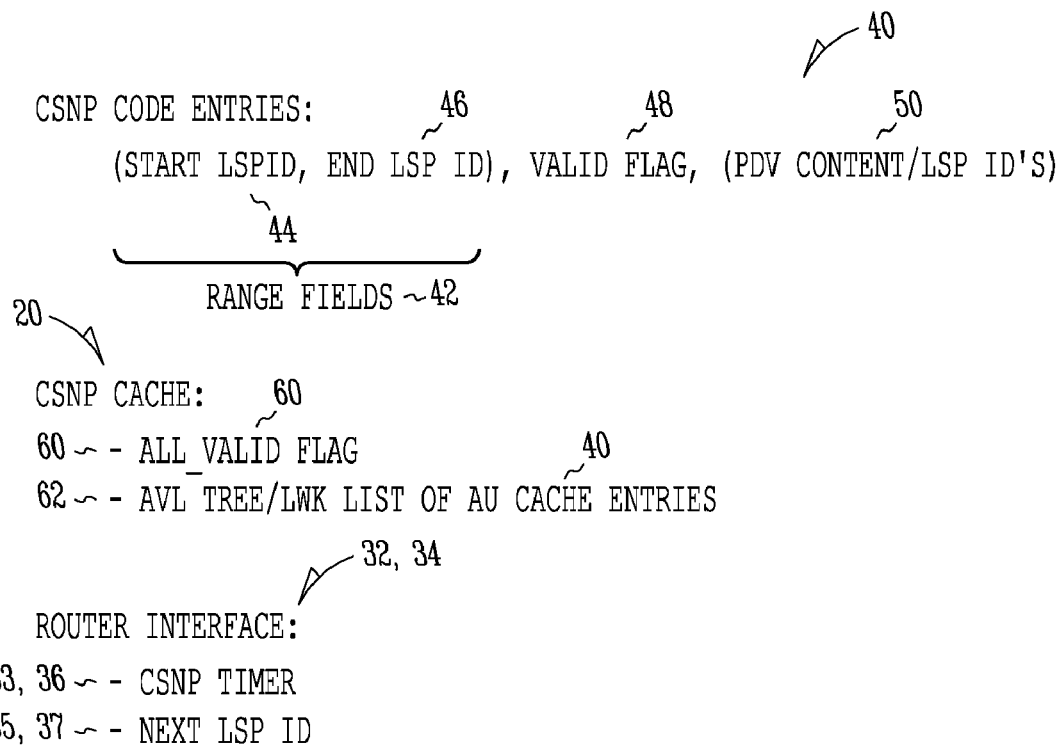
FIG. 3 illustrates an example of various data structures which may be used by embodiments of the present invention.

FIG. 3 illustrates data structures that may be used as the entries 40 in a CSNP cache 20, in accordance with an embodiment of the present invention. A CSNP entry 40 may include range field 42 that includes a start and end link state PDU identification 44, 46, such as a start and end LSP ID. Preferably, the range field 42 of each cache entry 40 has a start and end link state identification such that, when listed in the cache, all of the range fields 42 cover the entire range of possible link state identifications represented in the cache 20.

A cache entry 40 may also include "valid" flag 48 (true or false) indicating whether the cache entry 40 is valid or invalid. A cache entry 40 may also include PDU content 50 which may include a list of LPS headers which identify corresponding LSPs. In another example, PDU content 50 may include CSNP fragments which may include a list of LSP IDs to be included in a CSNP message, and may include the start and end LSP ID and PDU header. For instance, each cache entry 40 may include one or more LSP headers which identify corresponding LSPs.

An example of a cache 20 is also shown in FIG. 3, in accordance with one embodiment of the present invention. In one example, a CSNP cache 20 may include a flag "all_valid" 60 (either true or false) indicating whether the cache is valid or invalid.

A cache 20 may also include an AVL tree or other data structure 62, such as a link list, of the cache entries 40 and allows fast insertion, deletion, and search of the data structure 62. In one example, the AVL tree 62 includes all of the cache entries or CSNP fragments 40. An AVL tree 62, such as a balanced binary search tree, may be used to store records or entries 40. In one example, an AVL tree implementation 62 could utilize threaded processes for processing of the cache entries 40.

In one example, the cache 20 may be indexed by the first LSP ID listed in the cache entry. Each node in the AVL tree can be individually invalidated and the entire cache can be invalidated atomically, in one example.

For each interface 32, 34 of a router 24 that is providing a CSNP packet 22, a CSNP timer value 33, 36 may be associated with such interface 32, 34. For example, the CSNP timer 33 may be a periodic timer that expires every ten seconds. Further, a value or address for the "next LSP identification" 35, 37 may also be associated with such interface 32, 34.

Figure 4:
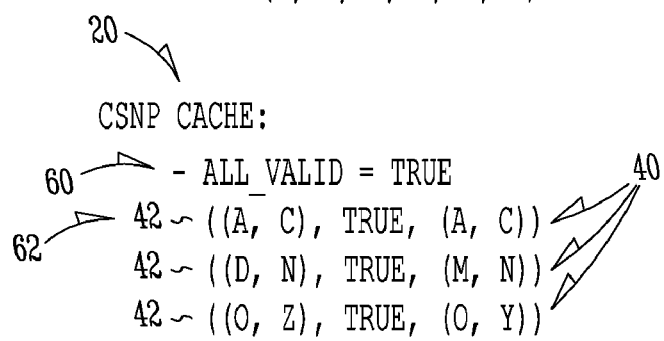
FIG. 4 illustrates an example of a data structure, in accordance with one embodiment of the present invention.

FIG. 4 below shows an example of cache entries, in accordance with one embodiment of the present invention. In the example of FIG. 4, assume the LSP ID range is A to Z, with six LSPs existing (A, C, M, N, O, Y) in the link state database 26.

Suppose also that the LSP maximum transmission unit (MTU) is set such that only two LSP IDs fit in one CSNP cache entry/CSNP fragment 40. Because in this example there are six LSPs in the database 26, there will be three cache entries/CSNP fragments 40.

In this example, the CSNP cache 20 may be as shown in FIG. 4: the "all valid" flag 60 is true for the cache, and there are three CSNP entries 40 shown as:

(A, C, true, [A, C])
(D, N, true, [M, N])
(O, Z, true, [O, Y])

The first entry in the cache 20 has a range field 42 of (A, C) because the LSPs in the cache entry 40 have LSP IDs of (A, C) which range from (A) to (C). The second entry in the cache 20 has a range field 42 of (D, N) because the LSPs in the cache entry have LSP IDs (M, N) which are part of the overall range of (D, N). The third in the cache 20 has a range field 42 of (O, Z) because the LSPs in the cache entry have LSP IDs (O, Y) which are part of the overall range of (O, Z). Hence, the range fields of each cache entry, together, cover the overall range from (A) to (Z).

In operation, for example when CSNP process 31 of router 24 has CSNP timer 33 expire on interface 32 (such as an IS-IS interface), the CSNP process 31 looks to the cache 20 to form a first CSNP packet 22. Using the "next LSP identification" 35 the CSNP process 31 obtains the LSP information from the appropriate CSNP cache entry and transmits this information to the other routers over the interface 32. The "next LSP identification" 35 is updated, and the CSNP process 31 then transmits over the interface 32 a CSNP packet 22 with LSP information from the next CSNP cache entry. An embodiment of this process is described in FIG. 7 below.

Figure 5:
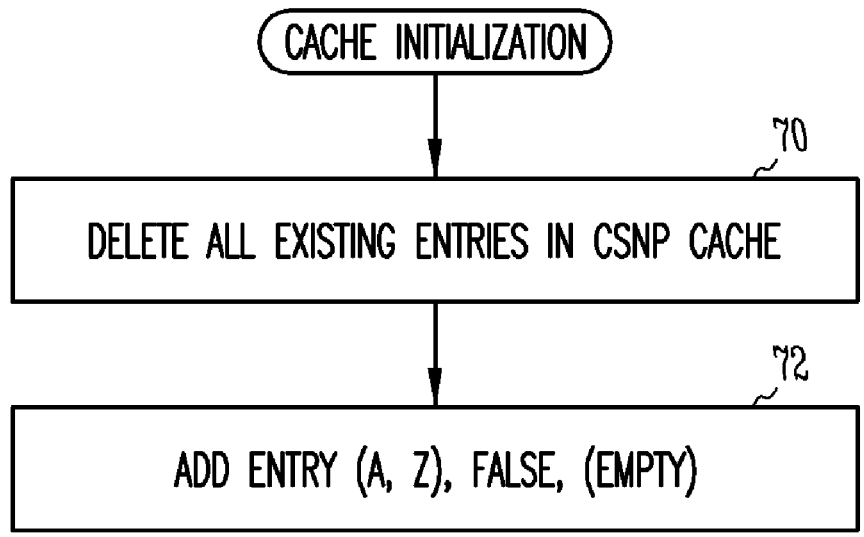
FIG. 5 illustrates an example of logical operations for initializing the CSNP cache, in accordance with one embodiment of the present invention.

FIG. 5 illustrates an example of operations for initializing a CSNP cache, in accordance with an embodiment of the present invention. The operations of FIG. 5 for CSNP cache initialization can occur, for instance, when a configuration or reconfiguration of an LSP MTU (maximum transmission unit) is specified. At operation 70, all existing entries in a CSNP cache are deleted. At operation 72, an entry can be added to the cache. In one example, a cache entry may include a range field (i.e., specifying a start LSP ID and an end LSP ID), a valid flag or bit (true or false), and the PDU content. As shown in FIG. 5, in one example when a new entry is added, it may have an initial setting wherein the range field covers the entire range of LSP IDs (shown as (A, Z)), the valid flag or bit is false and the PDU content is empty or null.

Figure 6:
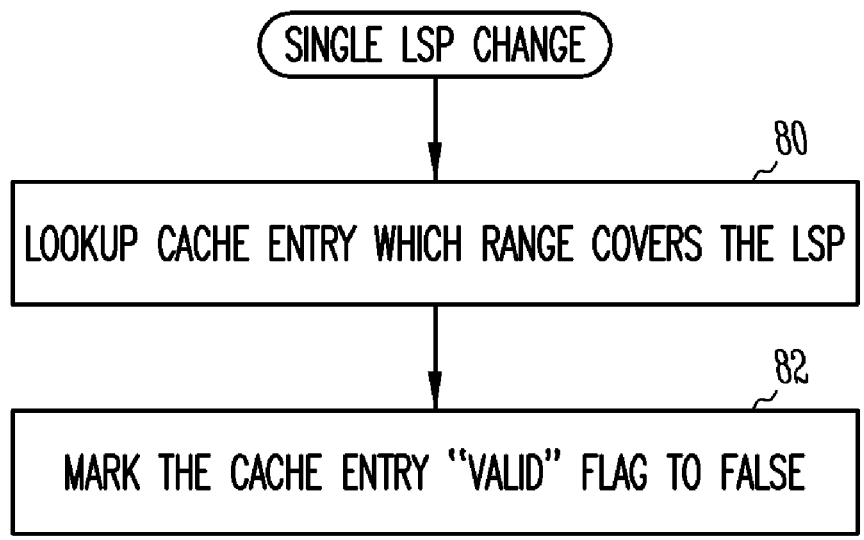
FIG. 6 illustrates an example of logical operations for changing an entry of the CSNP cache, in accordance with one embodiment of the present invention.

The operations of FIG. 6 relate to a change in a single LSP, which will effect a corresponding change in the CSNP cache in accordance with one embodiment of the present invention. These operations may occur when there is an update to a local LSP, or the router receives a newer LSP. At operation 80, upon receiving an LSP, a lookup occurs of entries in the cache for a range which covers or includes the affected LSP. At operation 82, the CSNP cache entry associated with the affected LSP are marked invalid or false. The new LSP will be stored in the LSDB 26.

Figure 7:
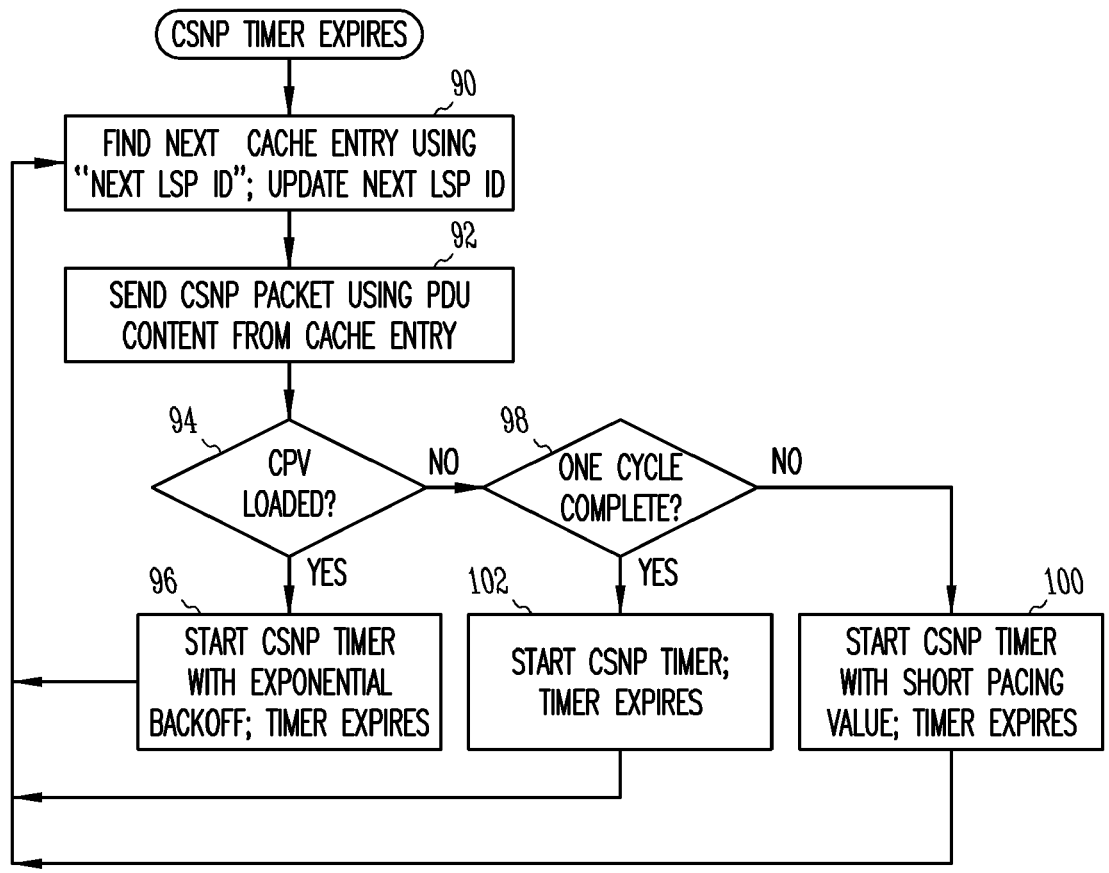
FIG. 7 illustrates an example of logical operations for processing an expired CSNP timer, in accordance with one embodiment of the present invention.

FIG. 7 illustrates an example of operations for forming and transmitting CSNP packets or messages using a CSNP cache in accordance with one embodiment of the present invention. When a CSNP timer has expired, such as over one or more interfaces of the router, the example operations of FIG. 7 may be performed. In one example, CSNP timers expire periodically, and accordingly, one or more of the example operations of FIG. 7 may be performed periodically.

At operation 90, the interface's "next LSP ID" is used to find, from the cache, the next cache entry for transmission, and the appropriate cache entry is retrieved. In one example, once this "next LSP ID" cache entry is found, the "next LSP ID" may be updated to be set to the end LSP ID in the cache entry, or to the beginning of the LSP ID range if needed. Operation 90 may be implemented using the operations of FIG. 8, described below, if desired.

At operation 92, the CSNP fragment/PDU content contained in the retrieved cache entry of operation 90 is sent as a CSNP packet or message over the respective router interface (i.e., router sends the CSNP fragment as a packet out of the interface which CSNP timer has expired). The transmission of the CSNP packet or message can utilize conventional methods for transmitting a CSNP packet. Other IS-IS routers on the same interface will receive the CSNP fragment and check it against their own link state data bases for consistency.

In one example, operation 92 sends multiple CSNP fragments to cover the LSP ID range. For example, in the example of FIG. 4, if the next LSP ID is "A" then operation 92 transmits the relevant contents of the first cache entry (A, C, TRUE, (A, C)), so that the CSNP message with LSP IDs of A, C are sent.

At operation 94, if the CPU is loaded, then control is passed to operation 96 which starts the CSNP timer, for instance, with exponential back off of, for example, eight times the configured value. The timer may be loaded with other values or by other conventional timer loading procedures or values. Hence, at operation 96, the timer is reloaded before the next cache entry is transmitted. When the timer of operation 96 expires, control may be returned to operation 90 to obtain and transmit LSPs information from the next cache entry.

In one example, the load of the system can be used when computing the value to give the timer when restarting the timer. If the 1 minute load average is greater than 0.5, then the previous CSNP interval can be doubled, for instance. The upper bound for this operation may be a multiplier, such as 8× of the configured value, in one example, although other upper limits are possible. This can ensure that some CSNP generation will occur.

If, at operation 94, the CPU is not loaded, then control is passed to operation. Operation 98 determines whether one cycle of sending CSNP fragments has been completed. If not, control is passed to operation 100 (optional) which starts a CSNP timer with a short pacing values, such as a short pacing value of 66 msec as an example. When the timer of operation 100 expires, control may be returned to operation 90 to obtain and transmit LSPs from the next cache entry.

To cover the whole database of link states, there could be more than one CSNP fragment that needs to be transmitted. The normal configured CSNP timer can be the interval between sending the whole set CSNP fragments (one cycle). For example, suppose there are CSNP fragments 1, 2 and 3 and a CSNP timer of 10 seconds, then CSNP fragments 1, 2, 3 will be sent; keep quiet for 10 seconds; send CSNP fragment 1, 2, 3; keep quiet for 10 seconds, and so on. In one implementation, a wait time, such as of 66 msec as a short pacing timer, can be used as the amount of time to wait between sending fragments 1-2 and 2-3.

If, however, operation 98 determines that one cycle is complete, then control is passed to operation 102 which starts the CSNP timer with a configured value. When the timer of operation 102 expires, control may be returned to operation 90 to obtain and transmit LSPs from the next cache entry.

In one example and during the normal course of operations, a CSNP timer for an interface will expire indicating that it is time for a router to send CSNP messages with all of the link states from the router's link state data base. Instead of walking the link state data base, the CSNP cache will be used to generate the CSNP messages. Operation 90 will obtain the next cache entry using the "next LSP ID." From that entry, operation 92 will transmit, as a CSNP message, the LSPs stored in that cache entry. Operation 98 (optional) will then introduce an short pacing timer if desired, until the process will then return to operation 90 to obtain the next cache entry using the "next LSP ID" so that a CSNP message can be transmitted with the LSPs stored in that cache entry. This process will continue, in one example, until all of the LSPs in the cache have been transmitted.

Figure 8:
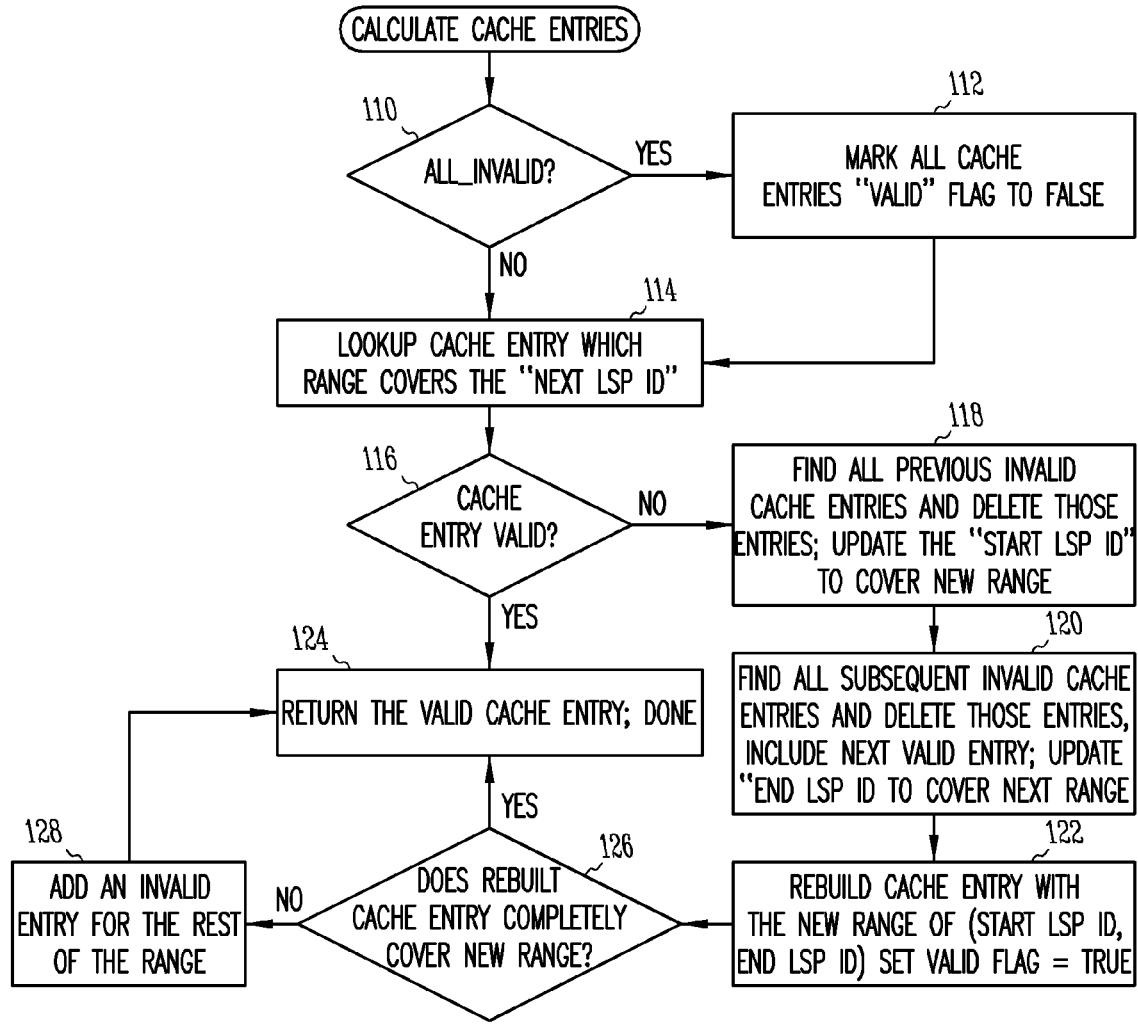
FIG. 8 illustrates an example of logical operations for calculating CSNP fragments, in accordance with one embodiment of the present invention.

FIG. 8 illustrates an example of the logical operations for calculating CSNP cache entries. These operations can be used for operation 90 of FIG. 7, if desired.

At operation 110 of FIG. 8, the cache flag "all_valid" is examined to determine whether all the entries in the CSNP cache are valid or if some are invalid. If some entries are invalid, then at operation 112, all CSNP cache entries are marked invalid or false and control is passed to operation 114 (below). If, at operation 110, the "all_valid" flag of the cache is false (i.e., the cache is valid), then control is passed to operation 114.

At operation 114, based on the next LSP ID, a lookup of the CSNP cache entries occurs which range covers the next LSP ID.

At operation 116, if the cache entry is not valid, then control is passed to operations 118-122. However, if operation 116 determines that the CSNP cache entry is valid, then control is passed to operation 124 which returns the valid CSNP cache entry, and this iteration of the process is complete.

If at operation 116, the CSNP cache entry is invalid, the control is passed to operation 118 where all previous CSNP invalid cache entries are located and, in one example, deleted. This operation may also include updating the CSNP cache entry's "start LSP ID" to cover the new range.

Operation 120 finds all subsequent CSNP cache entries which are invalid, and in one example these entries are deleted, the next valid CSNP entry is included, and the "end LSP ID" is updated to cover the new range. At operation 122, the CSNP cache entries are rebuilt with the new range, and the "valid" flag is set to be true for this cache entry.

Operation 126 determines whether the rebuilt cache entry completely covers the new range, and if so, control is passed to operation 124 which returns the valid CSNP fragment, and this iteration of the process is complete. Otherwise, operation 126 passes control to operation 128 which adds an invalid CSNP cache entry for the rest of the range, in one example. This invalid entry will be rebuilt upon the next CSNP timer expiration.

Figure 9:
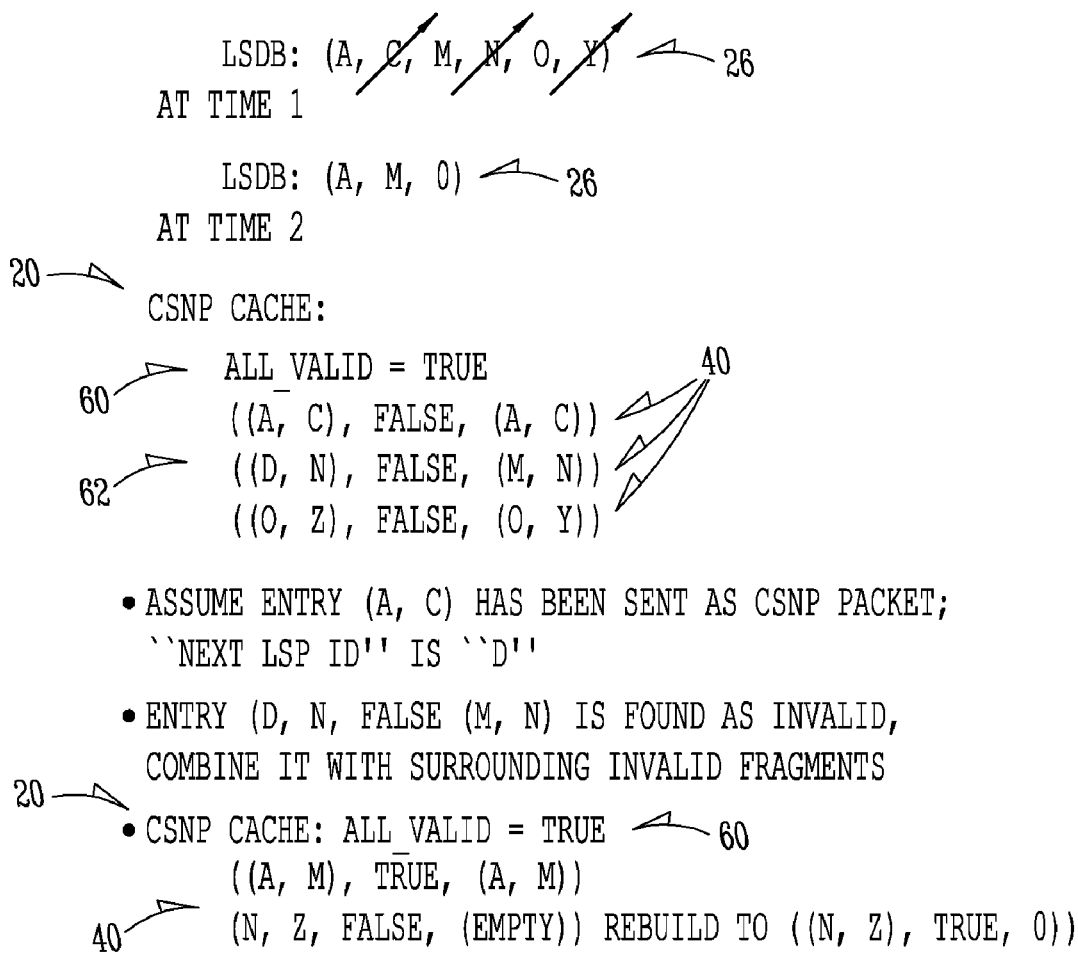
FIG. 9 illustrates an example of coalescing CSNP entries, in accordance with one embodiment of the present invention.

FIG. 9 illustrates an example of coalescing entries in the cache 20, in accordance with one embodiment of the present invention. In the example of FIG. 9, assume that the link state database 26 has changed from having six LSPs therein (A, C, M, N, O, Y) to now having only three LSPs therein (A, M, O).

In the CSNP cache 20, the "all valid" flag 60 may be set to true, and the AVL tree or link list 62 of the CSNP cache entries 40 may include:
(A, C, false, [A, C])
(D, N, false, [M, N])
(O, Z, false, [O, Y])

Further assume that the LSPs from cache entry (A, C) have been sent, and the interface "next LSP ID" equals D.

Using the next LSP ID of D, the cache entry of (D, N, false, [M, N]) is found. Since it is not valid, coalescing/merging of entries is used and it is combined with the surrounding invalid fragments. In coalescing to build for range (A, Z) and to yield the fragment (A, M, true, [A, M]), since the complete range of (A, Z) is not covered, a new invalid entry is added of (N, Z, false, [empty]).

Accordingly, the CSNP cache 20 will have the "all valid" flag 60 set as true, and will have the CSNP cache entries 40 of
(A, M, true, [A, M])
(N, Z, false, [empty])

Now the fragment (A, M) is sent as a CSNP message, and the fragment (N, Z) may be rebuilt to (N, Z, true, [O]) next time after the next CSNP timer expiration and be sent then.

As described herein, individual cache entries 40 can be invalidated when the corresponding portion of the link state database 26 changes. Each invalidated cached entry 40 may be rebuilt only once, in one example, for the first interface which has to send out that fragment. If the LSDB 26 does not change until the next batch of CSNP timer's expiration, the cache 20 can be reused by other interfaces if desired.

In the worst case that LSDB 26 keep changing, at each CSNP timer expiration, a walk of LSDB 26 covering the fragment range may be performed, which would be a similar amount of processing as if no cache 20 is implemented in the first place. However, the cache 20 can provide a good hit rate achievable over long periods of time.

If a timer thread encounters a cache 20 that has been globally invalidated, then in one example before other operations, the timer thread can invalidate all entries 40 in the cache 20 and then globally validate the cache 20.

The cache 20 can be referenced by each interface 32, 34 of a router 24 independently. In one embodiment, there may be a timer (i.e., 33 or 36) running on each interface (i.e., 32, 34) and that each of these timers will expire on their own. Through the use of a cache 20, efficiencies can be realized as walking the LSP database 26 and formatting the PDUs will already be done on any cache hit.

To further reduce the amount of processing necessary, in one example, if all interfaces 32, 34 are configured to support the LSP MTU size, then the CSNP packets may be formatted to this size. While this may cause more CSNP fragmentation, the PDUs can be reusable across all interfaces.

In one example, where point-to-point links are used, since a node receiving a CSNP packet can respond by sending PSNPs or LSPs, a node that is receiving CSNP packets does not also send them. Thus, when a CSNP packet is received, the CSNP timer on that interface can be restarted.

Cache flushing and recomputation may occur as part of a timer thread, when an interface's CSNP timer expires. This permits the load kept on other threads to be light.

Embodiments of the present invention may also be used for generating CSNP packets for an Ethernet. Since only the designated router (DIS) sends CSNP packets for an Ethernet, a CSNP timer may start only when an interface or router becomes DIS if desired. At that point, the contents of the cache can again be sent.

In one example, the entries (i.e., range fields 42) in the cache never overlap. The entries 40 can be arranged in the AVL tree 62 in monotonically increasing order if desired. In one example, all of the cache entries 40 (both invalid and valid) in the cache 20 cover the entire possible LSP ID range and thus fully represent the database 26. Cache entries 40 can be coalesced, for instance through the use of the operations of the example of FIG. 9, described above.

In one example, each cache entry 40 may carry a count of the number of entries that it held the last time it was recomputed. This can be used to estimate the number of entries 40 on the next computation.

Cache invalidation may occur if something in the environment changes substantially (e.g., a change in the LSP MTU). If desired, the entire cache 20 may be invalidated.

In one example, if a single LSP is changing (i.e., refreshed, purged, added), then only the cache entry 40 containing that LSP may be invalidated. Purges and adds can update the number of LSPs in the cache entry 40 as an aid to estimation of the number of LSPs for a cache entry 40.

In one example, if a cache entry 40 is invalid and needs to be recomputed, then it may be coalesced with other cache entries 40. Any cache entry 40 may have 0, 1 or 2 immediate neighbors. Each cache entry 40 may contain the number of LSPs listed in that entry, however for invalid cache entries, this number may not be accurate. Preferably, as many of the three cache entries 40 as possible are coalesced. The number of LSPs listed in each cache entry 40 is used as an estimate of the size of that cache entry 40. If the invalid cache entry 40 plus its left hand neighbor can be coalesced, then the range of their LSP IDs can be merged and the left hand neighbor can be removed from the LSP database 26. As to coalesced cache entries, a determination can be made whether or not it can be coalesced with the right hand fragment. If so, then the LSP ranges can be coalesced and the right hand neighbor may be deleted from the AVL tree 62. Next, the cache entry 40 may be recomputed. If the size estimates are incorrect, the first cache entry to be returned will not cover the entire range. The cache entry may be inserted into the AVL tree 62 and that range can be subtracted from the cache entries to be computed. Cache entries 40 may be iteratively computed until the entire range has been computed, and the first fragment for transmission may be used.

If the number of LSPs to be fit into a cache entry 40 exceeds the number possible (due to MTU restrictions or otherwise), then in one example, the computation of the cache entry 40 will indicate this and the LSP space may be subdivided into multiple cache entries. As cache entries 40 are computed, the computed cache entries are stored and the covered LSP space can be subtracted from the range that is being computed.

In other embodiments, an index of an LSP into a CSNP function 30, 31 may be maintained. Since the format of the CSNP packet is known, the overhead is fixed. In one example, each LSP entry is a fixed size, so that the entire CSNP packet(s) can be regarded as an array of LSP entries. If the index of an LSP entry is stored as part of the LSP in the link state database 26, it becomes faster to update the LSP entry on normal LSP refreshes. In another example, CSNP packets can be repacked in different ways, if desired.

The invalidation and recomputation of CSNP cache entries 40 may be rate limited if desired. For instance, a timestamp could be kept for each cache entry, and skip could occur over a cache entry 40 when it is not ready to be recomputed, yet ensure that it gets transmitted whenever it is recomputed. One way would be to use a transmit list for this. Another way would be to ensure that each interface periodically would not skip a given cache entry.

Embodiments of the present invention may be used or implemented in networking devices, communication devices, or computing devices, such as for example routers.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

What is claimed is:

1. A networking device for use in a network, the network device comprising:
   a link-state database storing a plurality of link state entries;
   a cache, operatively coupled with the link-state database, the cache storing entries relating to the link state entries of the link-state database; and
   at least one processor operatively coupled with the cache to:
   determine a change to the link-state database:
   coalesce the plurality of cache entries in response to said change to the link-state database, such that the cache has fewer cache entries after the coalescing;
   update the cache entries in the cache;
   determine that a complete range of possible link-state identifications is not represented in the cache entries;
   add a new invalid entry into the cache; and
   set a Protocol Data Unit (PDU) field of the new invalid entry to zero, and set a valid flag of the cache entry to true.

2. The networking device of claim 1, wherein the link state entries are derived from link state packets received by the networking device.

3. The networking device of claim 1, wherein the networking device has multiple interfaces.

4. The networking device of claim 1, wherein the entries stored in the cache include a list of link state headers.

5. The networking device of claim 1, wherein the entries stored in the cache include data which identifies one or more link states.

6. The networking device of claim 1, wherein entries stored in the cache are arranged in an tree data structure.

7. The networking device of claim 1, wherein entries stored in the cache are arranged in a link-list data structure.

8. The networking device of claim 1, wherein the networking device is a router.

9. The apparatus of claim 1, wherein the at least one processor is further to access the cache to create one or more packets including link state data, and to send the one or more packets over the network.

10. The networking device of claim 9, further comprising:
    a timer for providing a periodic interval that controls transmission of the network packets including link state data.

11. The networking device of claim 10, wherein when the timer expires, the at least one processor access the cache to create the one or more packets including link state data.

12. The networking device of claim 9, wherein the packets are CSNP packets.

13. An apparatus comprising:
    at least one processor; and
    a non-transitory computer usable medium in communication with the at least one processor, the computer usable medium having stored therein computer readable code for execution and when executed operable to:
    determine a change to a link-state database which stores a plurality of link state entries which are related to a plurality of cache entries in a cache operatively coupled with the link-state database;
    coalesce the plurality of cache entries in response to said change to the link-state database, such that the cache has fewer cache entries after the coalescing;
    update the cache entries in the cache;
    determine that a complete range of possible link-state identifications is not represented in the cache entries;
    add a new invalid entry into the cache; and set a Protocol Data Unit (PDU) field of the new invalid entry to zero, and set a valid flag of the cache entry to true.

14. The apparatus of claim 13, in which the computer readable code, when executed, is further operable to:
  determine that a number of Link-State Packets (LSPs) for a cache entry exceeds a number of possible LSPs for that cache entry; and
  subdivide the cache entry into multiple cache entries to accommodate the LSPs.

15. The apparatus of claim 13, in which the computer readable code, when executed, is further operable to:
  determine that the cache entries include three Complete Sequence Number Protocol Data Units (CSNP) code entries organized as a tree; and
  coalesce the three CSNP code entries by removing one of the three CSNP code entries as a left hand neighbor from the tree.

16. The apparatus of claim 15, in which the computer readable code, when executed, is operable to coalesce the three CSNP code entries by removing one of the three CSNP code entries as a right hand neighbor from the tree.

17. An apparatus comprising:
  at least one processor; and
  a non-transitory computer usable medium in communication with the at least one processor, the computer usable medium having stored therein computer readable code for execution and when executed operable to:
    determine a change to a link-state database which stores a plurality of link state entries which are related to a plurality of cache entries in a cache operatively coupled with the link-state database;
    coalesce the plurality of cache entries in response to said change to the link-state database, such that the cache has fewer cache entries after the coalescing;
    update the cache entries in the cache;
    determine that a number of Link-State Packets (LSPs) for a cache entry exceeds a number of possible LSPs for that cache entry; and
    subdivide the cache entry into multiple cache entries to accommodate the LSPs.

18. The apparatus of claim 17, in which the computer readable code, when executed, is operable to coalesce three CSNP code entries by removing one of the three CSNP code entries as a right hand neighbor from the tree.

\* \* \* \* \*